US012775355B2

(12) United States Patent
Qin

(10) Patent No.: US 12,775,355 B2
(45) Date of Patent: Oct. 27, 2026

(54) SIGNAL INTENSITY REGULATING CIRCUIT, INFRARED TOUCH DEVICE AND ELECTRONIC EQUIPMENT

(71) Applicant: Guangzhou Zhongyuan Intelligent Technology Co., Ltd., Guangzhou (CN)

(72) Inventor: Liang Qin, Guangzhou (CN)

(73) Assignee: Guangzhou Zhongyuan Intelligent Technology Co., Ltd., Guangzhou (CN)

( * ) Notice: Subject to any disclaimer, the term of this patent is extended or adjusted under 35 U.S.C. 154(b) by 0 days.

(21) Appl. No.: 19/063,522

(22) Filed: Feb. 26, 2025

(65) Prior Publication Data

US 2025/0199642 A1 Jun. 19, 2025

Related U.S. Application Data

(63) Continuation-in-part of application No. PCT/CN2023/114189, filed on Aug. 22, 2023.

(30) Foreign Application Priority Data

Aug. 26, 2022 (CN) ......................... 202211034854.2
Aug. 26, 2022 (CN) ......................... 202222282111.9

(51) Int. Cl.
*G06F 3/041* (2006.01)
*G06F 3/042* (2006.01)

(52) U.S. Cl.
CPC ............ *G06F 3/0418* (2013.01); *G06F 3/042* (2013.01)

(58) Field of Classification Search
CPC ...... G06F 3/0418; G06F 3/042; G06F 3/0416; H03K 2217/941; H03K 2217/9627; H03K 2217/96
See application file for complete search history.

(56) References Cited

U.S. PATENT DOCUMENTS

2010/0117986 A1* 5/2010 Yang .................. G06F 3/04182 345/174
2011/0163766 A1* 7/2011 Geaghan ............... G06F 3/0444 324/678
(Continued)

FOREIGN PATENT DOCUMENTS

CN 208046962 U 11/2018
CN 209913795 U 1/2020
(Continued)

OTHER PUBLICATIONS

Translation of CN-112311228-A (cite 6 in IDS dated Feb. 26, 2025) (Year: 2021).*

*Primary Examiner* — Liliana Cerullo
(74) *Attorney, Agent, or Firm* — ScienBiziP, P.C.

(57) ABSTRACT

The present disclosure provides a signal intensity regulating circuit, an infrared touch device, and an electronic equipment. The signal intensity regulating circuit includes a signal acquiring circuit, a controller and a signal regulating circuit; a first signal end of the switch element is connected to the signal output end of the signal acquiring circuit to form a signal voltage-dividing node connected to the signal input end of the controller; the controller outputs a corresponding regulation signal to the controlled end of the switch element based on the touch sampling signal received at the current moment, the switch element receives regulation signals of different intensities to generate a corresponding on-resistance, the signal voltage-dividing node forms a touch sampling signal at the next moment under the voltage-dividing action of the output impedance of the signal acquiring circuit and the on-resistance, and transmits it to the signal input end of the controller.

17 Claims, 3 Drawing Sheets

(56) References Cited

U.S. PATENT DOCUMENTS

| | | | | |
|---|---|---|---|---|
| 2021/0242774 | A1 | 8/2021 | Yun et al. | |
| 2021/0303101 | A1* | 9/2021 | Gray | G06F 3/016 |

FOREIGN PATENT DOCUMENTS

| | | | |
|---|---|---|---|
| CN | 210627166 | U | 5/2020 |
| CN | 111711343 | A | 9/2020 |
| CN | 112311228 | A | 2/2021 |
| CN | 112799551 | A | 5/2021 |
| CN | 113108936 | A | 7/2021 |
| CN | 214954937 | U | 11/2021 |
| CN | 218850753 | U | 4/2023 |

* cited by examiner

SIGNAL INTENSITY REGULATING CIRCUIT, INFRARED TOUCH DEVICE AND ELECTRONIC EQUIPMENT

RELATED APPLICATIONS

The present disclosure claims the priority of Chinese patent application No. 202211034854.2 filed on Aug. 26, 2022, entitled with "SIGNAL INTENSITY REGULATING CIRCUIT, INFRARED TOUCH DEVICE AND ELECTRONIC EQUIPMENT", and Chinese utility model application No. 202222282111.9 filed on Aug. 26, 2022, entitled with "SIGNAL INTENSITY REGULATING CIRCUIT, INFRARED TOUCH DEVICE AND ELECTRONIC EQUIPMENT", which is incorporated herein by reference in its entirety.

TECHNICAL FIELD

The present disclosure relates to the technical field of electronic circuits, and in particular to a signal intensity regulating circuit, an infrared touch device, and an electronic equipment.

BACKGROUND

On an interactive board or other touch devices, a touch circuit is usually provided to realize processing such as collection, filtering, and amplification of touch signals. A general touch control circuit includes a signal input circuit, a filter circuit, a signal regulating circuit and a controller which are electrically connected in sequence. The signal regulating circuit is composed of an analog switch chip, an operational amplifier and a matching resistor. Controlling the channel selection of the analog switch chip may regulate the signal amplification factor, thereby changing the signal intensity.

However, during the research and development process, the inventors of the present disclosure discovered that the regulation levels of the analog switch chip are limited by the limited number of channels inside the analog switch chip, and the regulation levels are only four to eight, which is a small number of regulation levels. Therefore, the regulatable fineness of the signal regulating circuit is affected. If more levels of regulation are required, multi-level chip cascading is required to achieve this, which results in a complex circuit structure and a high implementation cost.

SUMMARY OF INVENTION

The embodiments of the present disclosure provide a signal intensity regulating circuit, an infrared touch device and an electronic equipment. The signal intensity regulating circuit can make more fine regulation to the signal to be sampled, and has a simple circuit structure and is easy to implement.

According to a first aspect of an embodiment of the present disclosure, a signal intensity regulating circuit is provided, which includes a signal acquiring circuit, a controller and a signal regulating circuit, wherein the signal regulating circuit is connected between the signal acquiring circuit and the controller; the controller has a signal input end and a control end; the signal regulating circuit includes a switch element, the switch element has a first signal end, a second signal end and a controlled end; a signal voltage-dividing node is formed by connecting the first signal end of the switch element to a signal output end of the signal acquiring circuit, the signal voltage-dividing node is connected to the signal input end of the controller, the second signal end of the switch element is connected to a reference power supply, and the controlled end of the switch element is connected to the control end of the controller; the controller is configured to output a corresponding regulation signal to the controlled end of the switch element based on a touch sampling signal received at a current moment, the switch element is configured to generate a corresponding on-resistance based on the corresponding regulation signal, the signal voltage-dividing node is configured to form a touch sampling signal at a next moment, under a voltage-dividing action of an output impedance of the signal acquiring circuit and the corresponding on-resistance, and the signal voltage-dividing node is further configured to transmit the touch sampling signal to the signal input end of the controller.

According to a second aspect of the embodiments of the present disclosure, an infrared touch device is provided, which includes a signal intensity regulating circuit of any one of the above embodiments and an infrared signal receiving unit.

According to a third aspect of the embodiments of the present disclosure, an electronic equipment is provided, which includes an operating device and the infrared touch device of the above embodiment.

By applying the technical solution of the embodiment of the present disclosure, by providing a signal regulating circuit for regulating the touch sampling signal intensity between the signal acquiring circuit and the controller, the voltage of the touch sampling signal is regulated. When the controller outputs regulation signals of different voltages, on-resistances of different resistance values are generated inside the switch element of the signal regulating circuit. The on-resistance and the output impedance of the signal acquiring circuit form a voltage dividing circuit, thereby dividing the touch sampling signal to be sampled and forming touch sampling signals of different intensities at the current moment at the signal voltage-dividing node. The voltage value at the signal voltage-dividing node changes with the change of the regulation signal, thereby regulating the intensity of the touch sampling signal at the next moment with a relatively fine regulation degree.

It is to be understood that the above-mentioned general description and the following detailed description are exemplary and explanatory only and are not restrictive of the present disclosure.

For better understanding and implementation, the present disclosure is described in detail below with reference to the accompanying drawings.

DETAILED DESCRIPTION

Figure 1:
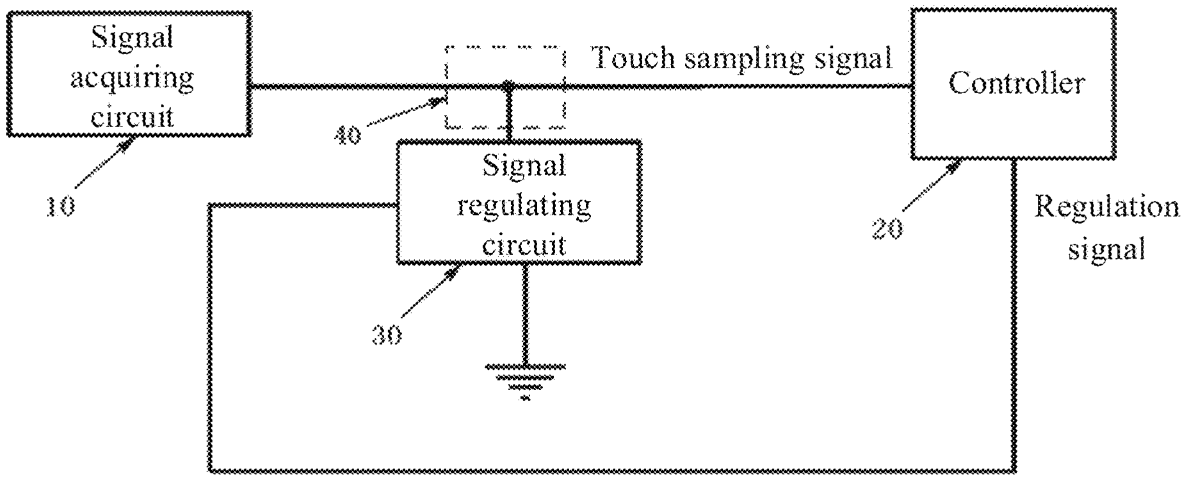
FIG. 1 is a schematic block diagram of a signal intensity regulating circuit according to an embodiment of the present disclosure.

Exemplary embodiments will be described in detail herein, and examples thereof are shown in the accompanying drawings. When the following description refers to the accompanying drawings, unless otherwise indicated, the same numbers in different drawings represent the same or similar elements. The implementation manners described in the following exemplary embodiments do not represent all implementation manners consistent with the present disclosure. Rather, they are merely examples of apparatuses and methods consistent with some aspects of the disclosure as detailed in the appended claims.

The terms used in the present disclosure are only for the purpose of describing particular embodiments and are not intended to be limiting of the present disclosure. The singular forms of "a", "said" and "the" used in the present application and the appended claims are also intended to include the plural forms, unless the context clearly indicates other meanings. It should also be understood that the term "and/or" used herein refers to and includes any and all possible combinations of one or more of the associated listed items.

It should be understood that although the terms first, second, third, etc. may be used in the present disclosure to describe various information, such information should not be limited to these terms. These terms are used only to distinguish information of the same type from one another. For example, without departing from the scope of the present disclosure, first information may also be referred to as second information, and similarly, second information may also be referred to as first information. Depending on the context, the words "if"/"in case" as used herein may be interpreted as "when . . . ", "while . . . " or "in response to determining".

The signal regulating circuit in the original touch device is limited by the limited number of channels inside the analog switch chip, with few regulatable levels, unable to achieve more fine sampling signal regulation, and is not convenient to use.

In order to solve the above problems, the embodiments of the present disclosure provide a signal intensity regulating circuit, an infrared touch device and an electronic equipment. The signal intensity regulating circuit can make a more precise regulation on the sampled signal, and has a simple circuit structure and is easy to implement.

Hereinafter, embodiments of the technical solution of the present disclosure will be described in conjunction with the accompanying drawings.

According to a first aspect of an embodiment of the present disclosure, a signal intensity regulating circuit is provided. The signal intensity regulating circuit may be applied to an electronic equipment with a touch function to regulate the intensity of a touch signal when the touch signal of the electronic equipment is collected. The electronic equipment may be an interactive board, a smart blackboard, a smart whiteboard, a personal computer, an industrial computer, a smart home central control and other smart devices, and the touch signal may be an infrared touch signal or other touch signal.

Figure 2:
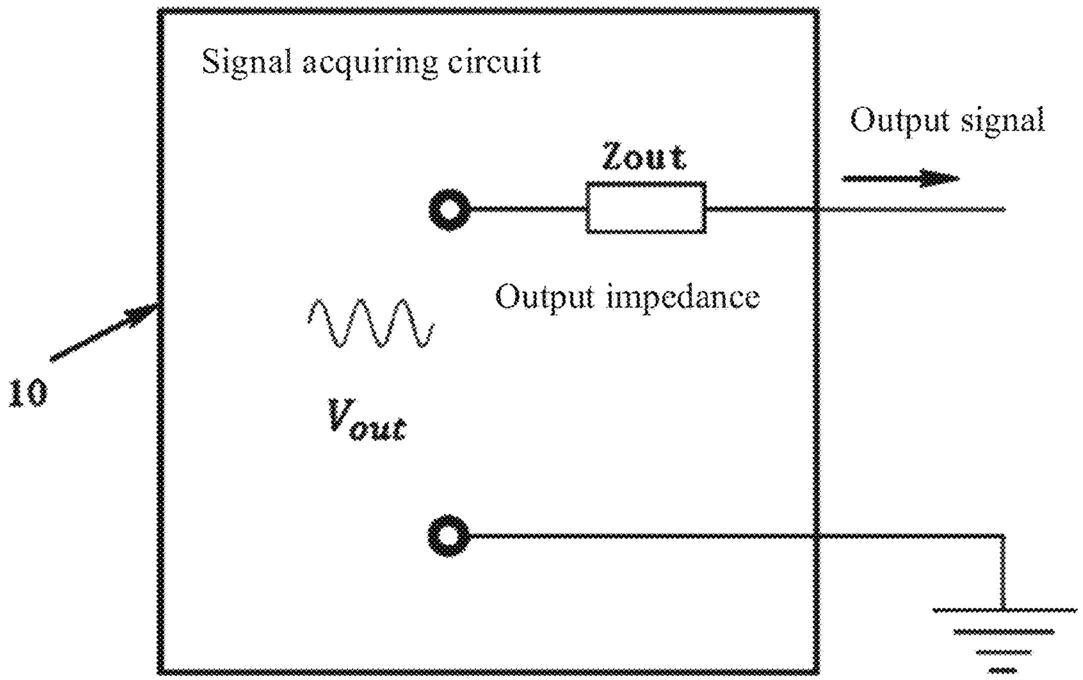
FIG. 2 is a schematic diagram of an output impedance of a signal acquiring circuit according to an embodiment of the present disclosure.

Referring to FIG. 1 and FIG. 2, FIG. 1 is a schematic block diagram of a signal intensity regulating circuit according to an embodiment of the present disclosure; and FIG. 2 is a schematic diagram of the output impedance of a signal acquiring circuit according to an embodiment of the present disclosure.

The signal intensity regulating circuit includes a signal acquiring circuit 10, a controller 20 and a signal regulating circuit 30; the signal regulating circuit 30 is connected between the signal acquiring circuit 10 and the controller 20. The signal acquiring circuit 10 is configured to obtain a touch sampling signal to be sampled. As shown in FIG. 2, the signal acquiring circuit 10 has a certain output impedance Zout.

The controller 20 may play a main control role, which may be a core processor of an electronic equipment, or a dedicated processor dedicated to realizing the touch function, and may generate a corresponding regulation signal for regulating the signal regulating circuit 30 based on the touch sampling signal received at the current moment, such as infrared, electromagnetic or capacitive touch signals. The controller 20 has a signal input end and a control end. The signal regulating circuit 30 is configured to regulate the intensity of the touch signal obtained by the signal acquiring circuit 10, and includes a switch element. The switch element may be a voltage-controlling switch element, when the controlled end (enable end) thereof receives different voltage signals, different on-resistances will be generated inside. The switch element has a first signal end, a second signal end and a controlled end; the first signal end of the switch element is connected to the signal output end of the signal acquiring circuit 10 and forms a signal voltage-dividing node 40, the signal voltage-dividing node 40 is connected to the signal input end of the controller 20, the second signal end of the switch element is connected to the reference power supply, and the controlled end of the switch element is connected to the control end of the controller 20; the controller 20 is configured to output a corresponding regulation signal to the controlled end of the switch element based on the touch sampling signal received at the current moment, and the switch element receives regulation signals of different intensities to generate on-resistances of different resistance values. The signal voltage-dividing node 40 forms a touch sampling signal at the next moment under the voltage dividing action of the output impedance of the signal acquiring circuit 10 and the on-resistance, that is, generates voltage sampling signals of different intensities and transmits them to the signal input end of the controller 20. The controller 20 then generates a corresponding regulation signal based on the touch sampling signal received in real time and outputs it to the controlled end of the switch element, thereby regulating the on-resistance of the switch element accordingly to change the intensity of the touch sampling signal at the next moment with high regulation accuracy.

As shown in FIG. 2, the output impedance of the signal acquiring circuit 10 is Zout. The output impedance Zout is very important for the signal acquiring circuit 10, which measures the output capability of the signal acquiring circuit 10. Optionally, in order to make the output impedance of the signal acquiring circuit 10 match the on-resistance of the switch element, the output impedance Zout may be within an optional range, such as between 10R and 1KΩ.

According to the technical solution of this embodiment, by providing a signal regulating circuit 30 for regulating the touch sampling signal intensity between the signal acquiring circuit 10 and the controller 20, the voltage of the touch sampling signal is regulated. When the controller 20 outputs regulation signals of different voltages, on-resistances of different resistance values are generated inside the switch element of the signal regulating circuit 30. The on-resistance and the output impedance of the signal acquiring circuit form a voltage dividing circuit, thereby dividing the touch sampling signal to be sampled and forming touch sampling signals of different intensities at the next moment at the signal voltage-dividing node 40. The voltage value at the signal voltage-dividing node 40 changes with the change of the regulation signal, thereby regulating the intensity of the touch sampling signal at the next moment with a relatively fine regulation degree.

In this embodiment, the signal acquiring circuit 10 may be a front-end signal regulating circuit, the front-end signal regulating circuit is connected to a touch sensor such as an infrared signal receiving unit, receives the touch sampling signal to be sampled, filters, amplifies, and processes it, and then transmits it to the controller 20 after being regulated by the signal regulating circuit 30.

The controller 20 is the main control device of the circuit. After receiving the touch sampling signal at the current moment, the controller 20 may control the operating device to execute the corresponding instruction so as to realize the corresponding touch function. The specific model of the controller 20 is not limited, and may be a processing device such as a single chip microcomputer.

Optionally, the controller 20 is configured to generate a corresponding regulation signal based on the touch sampling signal at the current moment and a preset target value, the preset target value may be a preset ideal sampling signal value. However, since the use environment and circuit, etc. may affect the touch sampling signal, it is necessary to generate a corresponding regulation signal based on the touch sampling signal at the current moment and the preset target value and transmit it to the controlled end of the switch element.

The reference power source connected to the second signal end of the switch element may be an auxiliary power source with a preset voltage value, such as a positive voltage or a negative voltage, or may be a zero potential auxiliary power source, that is, a reference ground (GND).

The switch element may be a voltage-controlling switch element, and when the controlled end (enabling end) thereof receives different voltage signals, different on-resistances will be generated inside the switch element.

In an optional embodiment, the voltage-controlling switch element may be a triode, a field effect triode, or other voltage-controlling switches. The triode includes an NPN triode and a PNP triode; the field effect triode includes an N-channel field effect triode and a P-channel field effect triode.

If the voltage-controlling switch element is a triode, the triode includes a base; a collector; and an emitter, the base of the triode is the controlled end of the switch element, one of the collector and the emitter of the triode is the first signal end of the switch element, and another one of the emitter and the collector of the triode is the second signal end of the switch element; the one of the collector and the emitter of the triode is connected to the signal output end of the signal acquiring circuit to form a signal voltage-dividing node 40, the another one of the emitter and the collector of the triode is connected to the reference power supply, and the base of the triode is connected to the control end of the controller.

If the voltage-controlling switch element is a field effect transistor. The field effect transistor includes a gate; a drain; and a source, the gate of the field effect transistor is the controlled end of the switch element, one of the drain or the source of the field effect transistor is the first signal end of the switch element, and another one of the source or the drain of the field effect transistor is the second signal end of the switch element; the one of the drain or the source of the field effect transistor is connected to the signal output end of the signal acquiring circuit to form a signal voltage-dividing node 40, the another one of the source or the drain of the field effect transistor is connected to the reference power supply, and the gate of the field effect transistor is connected to the control end of the controller.

It should be noted that the voltage-controlling switch element has multiple states such as saturation, conduction and cutoff. In the embodiment of the present disclosure, the corresponding state may be selected according to the needs.

The following is a description of a specific embodiment of a voltage-controlling switch element.

Figure 3:
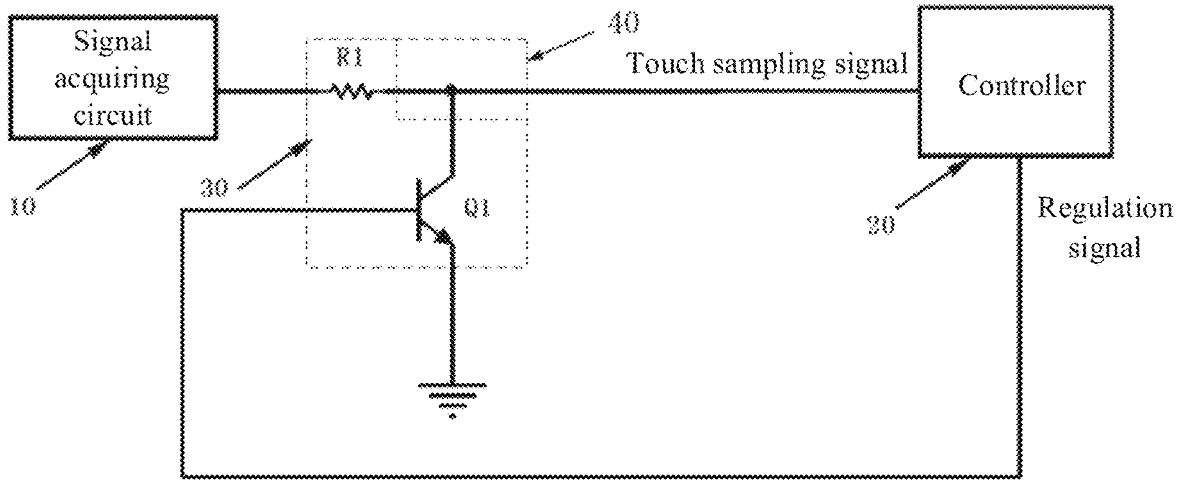
FIG. 3 is a circuit schematic diagram of a signal intensity regulating circuit according to Embodiment 1 of the present disclosure.

Referring to FIG. 3, FIG. 3 is a circuit schematic diagram of a signal intensity regulating circuit according to Embodiment 1 of the present disclosure.

In this embodiment, the voltage-controlling switch element is an NPN triode Q1.

The base B of the NPN triode Q1 is the controlled end of the switch element, the collector C of the NPN triode Q1 is the first signal end of the switch element, and the emitter E of the NPN triode Q1 is the second signal end of the switch element; the collector C of the NPN triode Q1 is connected to the signal output end of the signal acquiring circuit 10 and forms a signal voltage-dividing node 40, and the emitter E of the NPN triode Q1 is connected to the reference power supply, that is, ground; the base B of the NPN triode Q1 is connected to the control end of the controller 20 to receive the regulation signal.

When the controller 20 outputs regulation signals of different voltages, on-resistances of different resistances are generated inside the NPN triode Q1. The on-resistance and the output impedance of the signal acquiring circuit 10 form a voltage-dividing circuit, thereby dividing the touch sampling signal to be sampled and forming a touch sampling signal at the current moment with different voltage intensities at the signal voltage-dividing node 40. The voltage value at the signal voltage-dividing node 40 changes with the change of the regulation signal, thereby realizing the intensity regulation of the touch sampling signal at the current moment, and has a finer regulation degree, and the regulatable fineness is no longer limited by the number of channels of the analog switch chip.

In an optional embodiment, the voltage-controlling switch element is a PNP triode Q1.

Figure 4:
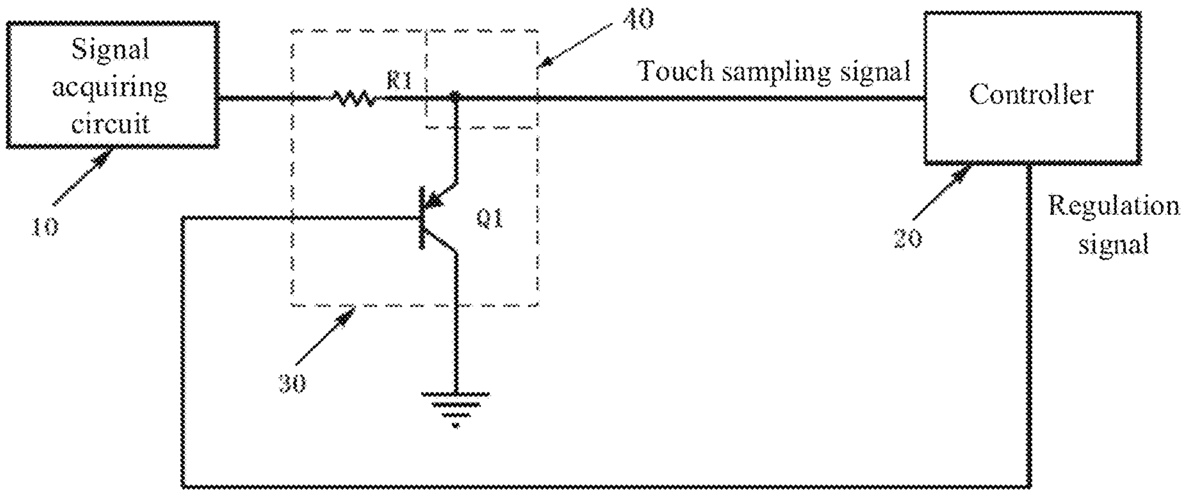
FIG. 4 is a circuit schematic diagram of a signal intensity regulating circuit according to Embodiment 2 of the present disclosure.

Referring to FIG. 4, FIG. 4 is a circuit schematic diagram of a signal intensity regulating circuit according to Embodiment 2 of the present disclosure.

The base B of the PNP triode Q1 is the controlled end of the switch element, the emitter E of the PNP triode Q1 is the first signal end of the switch element, and the collector C of the PNP triode Q1 is the second signal end of the switch element; the emitter E of the PNP triode Q1 is connected to the signal output end of the signal acquiring circuit 10 and forms a signal voltage-dividing node 40, and the collector of the PNP triode Q1 is connected to the reference power supply, that is, ground; the base B of the PNP triode Q1 is connected to the control end of the controller 20 to receive the regulation signal.

When the controller 20 outputs regulation signals of different voltages, on-resistances of different resistances are generated inside the PNP triode Q1. The on-resistance and the output impedance of the signal acquiring circuit form a voltage-dividing circuit, thereby dividing the touch sampling signal to be sampled and forming a touch sampling signal of different voltage intensities at the current moment at the signal voltage-dividing node 40. The voltage value at the signal voltage-dividing node 40 changes with the change of the regulation signal, thereby realizing the intensity regulation of the touch sampling signal at the current moment, and has a finer regulation degree, and the regulatable fineness is no longer limited by the number of channels of the analog switch chip.

In an optional embodiment, the voltage-controlling switch element may be an N-channel field effect triode.

Figure 5:
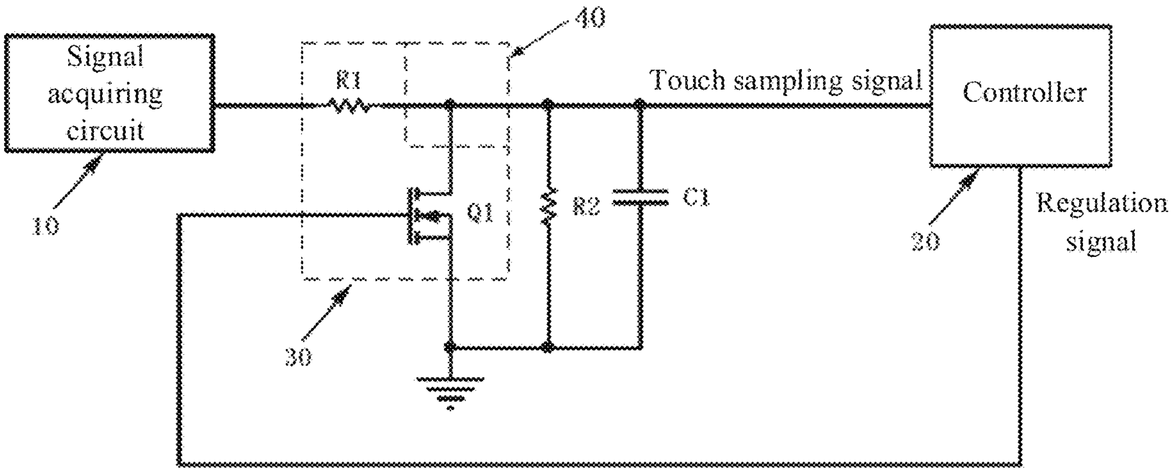
FIG. 5 is a circuit schematic diagram of a signal intensity regulating circuit according to Embodiment 3 of the present disclosure.

Referring to FIG. 5, FIG. 5 is a circuit schematic diagram of a signal intensity regulating circuit according to Embodiment 3 of the present disclosure.

The gate G of the N-channel field effect triode Q1 is the controlled end of the switch element, the drain D of the N-channel field effect triode Q1 is the first signal end of the switch element, and the source S of the N-channel field effect triode Q1 is the second signal end of the switch element; the drain D of the N-channel field effect triode Q1 is connected to the signal output end of the signal acquiring circuit 10 and forms a signal voltage-dividing node 40, the source S of the N-channel field effect triode Q1 is connected to the reference power supply (ground), and the gate G of the N-channel field effect triode Q1 is connected to the control end of the controller 20 to receive the regulation signal.

When the controller outputs regulation signals of different voltages, on-resistances of different resistances are generated inside the N-channel field effect triode Q1. The on-resistance and the output impedance at the back end of the signal acquiring circuit form a voltage-dividing circuit, thereby dividing the touch sampling signal to be sampled and forming a touch sampling signals of different intensities at the current moment at the signal voltage-dividing node 40. The voltage value at the signal voltage-dividing node 40 changes with the change of the regulation signal, thereby regulating the intensity of the touch sampling signal at the current moment with a relatively fine regulation degree, and the regulatable fineness is no longer limited by the number of channels of the analog switch chip.

In an optional embodiment, the voltage-controlling switch element may be a P-channel field effect triode.

Figure 6:
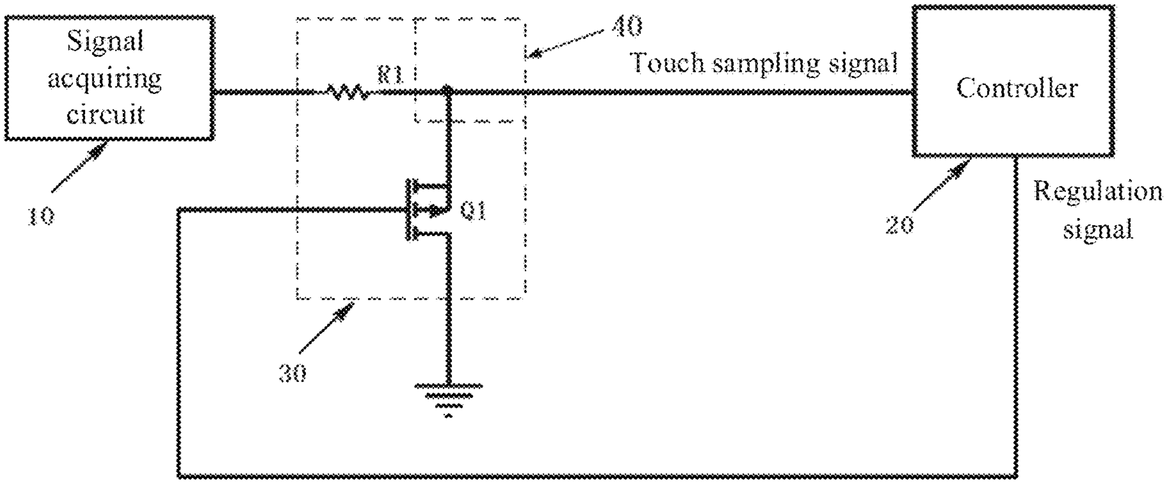
FIG. 6 is a circuit schematic diagram of a signal intensity regulating circuit according to Embodiment 4 of the present disclosure.

Referring to FIG. 6, FIG. 6 is a circuit schematic diagram of a signal intensity regulating circuit according to Embodiment 4 of the present disclosure.

The gate G of the P-channel field effect triode Q1 is the controlled end of the switch element, the source S of the P-channel field effect triode Q1 is the first signal end of the switch element, and the drain D of the P-channel field effect triode Q1 is the second signal end of the switch element; the source S of the P-channel field effect triode Q1 is connected to the signal output end of the signal acquiring circuit 10 and forms a signal voltage-dividing node 40, the drain D of the P-channel field effect triode Q1 is connected to the reference power supply (ground), and the gate G of the P-channel field effect triode Q1 is connected to the control end of the controller 20 to receive the regulation signal.

When the controller 20 outputs regulation signals of different voltages, on-resistances of different resistances are generated inside the P-channel field effect triode Q1. The on-resistance and the output impedance of the signal acquiring circuit form a voltage-dividing circuit, thereby dividing the touch sampling signal to be sampled and forming voltage sampling signals of different intensities at the signal voltage-dividing node 40. The voltage value at the signal voltage-dividing node 40 changes with the change of the regulation signal, thereby achieving intensity regulation of the touch sampling signal at the current moment with a relatively fine regulation degree, and the regulatable fineness is no longer limited by the number of channels of the analog switch chip.

In an optional embodiment, as shown in FIGS. 3 to 6, the signal regulating circuit 30 further includes a first resistor R1, the first resistor R1 is connected between the output end of the signal acquiring circuit 10 and the signal voltage-dividing node 40; the first resistor R1 is connected in series with the switch element Q1. If the internal output impedance of the signal acquiring circuit 10 is small and may be ignored, the on-resistance generated by the switch element Q1 and the first resistor R1 divide the touch sampling signal output by the signal acquiring circuit. If the internal output impedance of the signal acquiring circuit 10 is relatively large, the on-resistance generated by the switch element Q1, the first resistor R1, and the output impedance Zout divide the touch sampling signal to be sampled output by the signal acquiring circuit 10.

In order to make the first resistor R1 match the on-resistance of the switch element, the resistance of the first resistor R1 may be within an optional range, such as between 10R and 1KΩ.

The first resistor R1 may be a fixed resistor or a regulatable resistor. If the first resistor R1 is a regulatable resistor, the user may also regulate the signal regulation intensity by regulating the actual resistance value of the first resistor R1, which is more flexible to use.

Optionally, the first resistor R1 may be disposed inside or outside the signal acquiring circuit 10, which is not limited in this embodiment.

When the controller 20 outputs regulation signals of different magnitudes, the on-resistance of the switch element Q1 will change when it is in various states. Therefore, if the internal output impedance of the signal acquiring circuit 10 may be ignored, the touch sampling signal to be sampled will be divided under the action of the first resistor R1 and the on-resistance of the switch element Q1, and the regulated sampling signal is obtained at the signal voltage-dividing node 40 and transmitted to the controller 20. During voltage division, the ratio of the on-resistance of the first resistor R1 to the on-resistance of the switch element Q1 will affect the magnitude of the touch sampling signal at the next moment, thereby achieving intensity regulation of the touch sampling signal at the next moment.

In an optional embodiment, as shown in FIG. 5, a filter circuit is connected in parallel between the first signal end and the second signal end of the switch element Q1. The filter circuit includes a second resistor R2 and a first capacitor C1, and can filter the current touch sampling signal output by the signal voltage-dividing node 40 to improve the quality.

According to the signal intensity regulating circuit described in the above embodiment, by providing a signal regulating circuit for regulating the touch sampling signal intensity between the signal acquiring circuit and the controller, the voltage of the touch sampling signal is regulated. When the controller outputs regulation signals of different voltages, on-resistances of different resistance values are generated inside the switch element of the signal regulating circuit. The on-resistance and the output impedance of the signal acquiring circuit form a voltage dividing circuit, thereby dividing the touch sampling signal to be sampled and forming touch sampling signals of different intensities at the next moment at the signal voltage-dividing node. The voltage value at the signal voltage-dividing node changes with the change of the regulation signal, thereby regulating the intensity of the touch sampling signal at the next moment with a relatively fine regulation degree, and the circuit structure is simple and easy to implement.

According to a second aspect of the embodiments of the present disclosure, an infrared touch device is provided, which includes a touch signal receiving unit and a signal intensity regulating circuit as described in the previous embodiments.

The touch signal receiving unit is electrically connected to the signal intensity regulating circuit. After receiving the touch signal, the touch signal receiving unit transmits it to the signal acquiring circuit for pre-stage signal processing, and then transmits it to the signal regulating circuit for signal intensity regulation. Finally, the voltage sampling signal after intensity regulation is transmitted to the controller so that the controller controls the execution device to perform corresponding actions.

According to a third aspect of an embodiment of the present disclosure, an electronic equipment is provided, which includes an operating device and a touch control device as described in the previous embodiment.

The electronic equipment may be an interactive board with a touch function, a smart blackboard, a smart white-board, a personal computer, an industrial computer, a smart home central control, or other electronic equipment, which is not limited in this embodiment.

The operating device may be a display screen or other execution components.

According to the electronic equipment described in the above embodiment, by providing a signal regulating circuit for regulating the touch sampling signal intensity between the signal acquiring circuit and the controller, the voltage of the touch sampling signal is regulated. When the controller outputs regulation signals of different voltages, on-resistances of different resistance values are generated inside the switch element of the signal regulating circuit. The on-resistance and the output impedance of the signal acquiring circuit form a voltage dividing circuit, thereby dividing the touch sampling signal to be sampled and forming touch sampling signals of different intensities at the next moment at the signal voltage-dividing node. The voltage value at the signal voltage-dividing node changes with the change of the regulation signal, thereby regulating the intensity of the touch sampling signal at the next moment with a relatively fine regulation degree, and the circuit structure is simple and easy to implement.

The above embodiments only express several implementation manners of the present disclosure, and the description thereof is relatively specific and detailed, but it should not be understood as limiting the scope of the invention patent. It should be pointed out that, for those skilled in this field, several variations and improvements may be made without departing from the concept of the present disclosure, and these all fall within the protection scope of the present disclosure.

What is claimed is:

1. A signal intensity regulating circuit configured for applying to an electronic equipment to regulate an intensity of a touch signal transmitted form the electronic equipment, and comprising: a signal acquiring circuit, a controller and a signal regulating circuit, wherein the signal acquiring circuit is a front-end signal regulating circuit configured for connecting to a touch sensor and receiving a touch sampling signal from the touch sensor;

the signal regulating circuit is connected between the signal acquiring circuit and the controller; the controller has a signal input end and a control end and the signal regulating circuit comprises a switch element comprising a first signal end, a second signal end and a controlled end;

a signal voltage-dividing node is formed by connecting the first signal end of the switch element to a signal output end of the signal acquiring circuit, the signal voltage-dividing node is connected to the signal input end of the controller, the second signal end of the switch element is connected to a reference power supply, and the controlled end of the switch element is connected to the control end of the controller;

the controller is configured to generate a corresponding regulation signal based on the touch sampling signal received in real time and output the corresponding regulation signal to the controlled end of the switch element based on a touch sampling signal received at the real time, the switch element is configured to generate an on-resistance corresponding to the corresponding regulation signal at the real time, the signal voltage-dividing node is configured to form a touch sampling signal at a time after the real time, under a voltage-dividing action of an output impedance of the signal acquiring circuit and the on-resistance at the real time, and the signal voltage-dividing node is further configured to transmit the touch sampling signal at the time after the real time to the signal input end of the controller.

2. The signal intensity regulating circuit according to claim 1, wherein the switch element is a voltage-controlling switch element.

3. The signal intensity regulating circuit according to claim 2, wherein the voltage-controlling switch element is a triode comprising a base; a collector; and an emitter, wherein the base of the triode is the controlled end of the switch element, one of the collector or the emitter of the triode is the first signal end of the switch element, and another one of the emitter or the collector of the triode is the second signal end of the switch element;

the one of the collector or the emitter of the triode is further connected to the signal output end of the signal acquiring circuit to form the signal voltage-dividing node, the another one of the emitter or the collector of the triode is further connected to the reference power supply, and the base of the triode is connected to the control end of the controller.

4. The signal intensity regulating circuit according to claim 2, wherein the voltage-controlling switch element is a field effect transistor comprising a gate; a drain; and a source, wherein the gate of the field effect transistor is the controlled end of the switch element, one of the drain or the source of the field effect transistor is the first signal end of the switch element, and another one of the source or the drain of the field effect transistor is the second signal end of the switch element;

the one of the drain or the source of the field effect transistor is further connected to the signal output end of the signal acquiring circuit to form the signal voltage-dividing node, the another one of the source or the drain of the field effect transistor is further connected to the reference power supply, and the gate of the field effect transistor is connected to the control end of the controller.

5. The signal intensity regulating circuit according to claim 1, wherein the signal regulating circuit further includes a first resistor, the first resistor is connected between the output end of the signal acquiring circuit and the signal voltage-dividing node; the first resistor is connected in series with the switch element;

the on-resistance generated by the switch element, the output impedance of the signal acquiring circuit, and the first resistor divide the touch sampling signal that is to be sampled and output by the signal acquiring circuit.

6. The signal intensity regulating circuit according to claim 1, further comprising a filter circuit, wherein the filter circuit is connected in parallel between the first signal end and the second signal end of the switch element.

7. The signal intensity regulating circuit according to claim 1, wherein the reference power source is a positive voltage or a negative voltage, or a reference ground.

8. The signal intensity regulating circuit according to claim 1, wherein the controller is configured to generate the corresponding regulation signal based on a preset target value.

9. An infrared touch device comprising an infrared signal receiving unit and the signal intensity regulating circuit of claim 1.

10. The infrared touch device according to claim 9, wherein the switch element is a voltage-controlling switch element.

11. The infrared touch device according to claim 10, wherein the voltage-controlling switch element is a triode comprising a base; a collector; and an emitter, wherein the base of the triode is the controlled end of the switch element, one of the collector or the emitter of the triode is the first signal end of the switch element, and another one of the emitter or the collector of the triode is the second signal end of the switch element;

the one of the collector or the emitter of the triode is further connected to the signal output end of the signal acquiring circuit to form the signal voltage-dividing node, the another one of the emitter or the collector of the triode is further connected to the reference power supply, and the base of the triode is connected to the control end of the controller.

12. The infrared touch device according to claim 10, wherein the voltage-controlling switch element is a field effect transistor comprising a gate; a drain; and a source, wherein the gate of the field effect transistor is the controlled end of the switch element, one of the drain or the source of the field effect transistor is the first signal end of the switch element, and another one of the source or the drain of the field effect transistor is the second signal end of the switch element;

the one of the drain or the source of the field effect transistor is further connected to the signal output end of the signal acquiring circuit to form the signal voltage-dividing node, the another one of the source or the drain of the field effect transistor is further connected to the reference power supply, and the gate of the field effect transistor is connected to the control end of the controller.

13. The infrared touch device according to claim 9, wherein the signal regulating circuit further includes a first resistor, the first resistor is connected between the output end of the signal acquiring circuit and the signal voltage-dividing node; the first resistor is connected in series with the switch element;

the on-resistance generated by the switch element, the output impedance of the signal acquiring circuit, and the first resistor divide the touch sampling signal that is to be sampled and output by the signal acquiring circuit.

14. The infrared touch device according to claim 9, wherein the signal intensity regulating circuit further comprises a filter circuit connected in parallel between the first signal end and the second signal end of the switch element.

15. The infrared touch device according to claim 9, wherein the reference power source is a positive voltage or a negative voltage, or a reference ground.

16. The infrared touch device according to claim 9, wherein the controller is configured to generate the corresponding regulation signal based on a preset target value.

17. An electronic equipment, comprising an operating device and the infrared touch device of claim 9.

* * * * *